Nov. 1, 1966 C. G. MASTERS, JR 3,283,172

REDUNDANT MULTIVIBRATOR

Filed Oct. 21, 1963 2 Sheets-Sheet 1

WITNESSES

Leon J. Vaga

James T. Young

INVENTOR

Charles G. Masters, Jr.

BY Dean Schron

ATTORNEY

Nov. 1, 1966 C. G. MASTERS, JR 3,283,172

REDUNDANT MULTIVIBRATOR

Filed Oct. 21, 1963 2 Sheets-Sheet 2

United States Patent Office 3,283,172

Patented Nov. 1, 1966

3,283,172
REDUNDANT MULTIVIBRATOR

Charles G. Masters, Jr., Severn, Md., assignor to Westinghouse Electric Corporation, Pittsburgh, Pa., a corporation of Pennsylvania Filed Oct. 21, 1963, Ser. No. 317,751
4 Claims. (Cl. 307—88.5)

This invention in general relates to high reliability signal providing apparatus, and more in particular to a clock pulse source for redundant logical networks.

Redundant networks are utilized in many types of electrical systems and are particularly adapted for use in electronic computers. Generally, if a failure of a particular component occurs in a circuit of such an electronic computer, an erroneous output or control results, necessitating a replacement or repair of the faulty circuit. This may be a time consuming, and sometimes impossible, operation. To reduce or eliminate erroneous outputs, various systems have been built which utilize one or more redundancy techniques to greatly enhance computer operation by the elimination or masking of objectionable errors. In order to perform certain operations or to compare nominally identical bits of information in systems employing redundancy techniques, several signals must reach predetermined values at the same time. In conventional computers, synchronization and various controls are accomplished by timing different operations with a single source of regular pulses commonly called the clock. To use a conventional clock pulse source in a redundant system would be undesirable because the system so constructed would depend upon this single clock circuit for its operation, and if that circuit failed the entire system would fail.

It is, therefore, a primary object of the present invention to provide a highly reliable redundant clock pulse source.

It is another object to provide a redundant multivibrator employing decision elements.

Another object is to provide a redundant clock pulse source in which the output frequency may be varied.

It is another object to provide a redundant clock pulse source which is operative to provide a synchronous two phase output.

Another object is to provide a redundant multivibrator which produces the same effect as a group of synchronous multivibrators but is not dependent upon a single source of synchronizing signals.

Yet another object is to provide a highly reliable redundant clock source which may be utilized as a pulse generator.

Briefly, in accordance with the above objects, there is provided a redundant clock pulse source comprising a plurality of split multivibrators with each multivibrator including a first and a second stage active element. In a common multivibrator, an output signal provided by one stage is fed back, and controls the output signal provided by the other stage, as is well known to those skilled in the art. In the present invention the first stage elements provide output signals in response to a predetermined number of output signals provided by the second stage elements, and conversely the second stage elements provide output signals in accordance with a predetermined number of output signals provided by the first stage elements. This is accomplished by the provision of a decision element associated with the input of each stage. This decision element is responsive to output signals received from an opposite stage and provides a trigger signal to the control element of its respective stage. As a result of this decision function, neither stage in the multivibrator is wholly dependent upon the state of operation of the opposite stage originally associated with this particular multivibrator.

The stated and further objects, as well as the operation of the present invention, will become more apparent upon a reading of the following detailed specification taken in conjunction with the drawings, in which.

Figure 1:
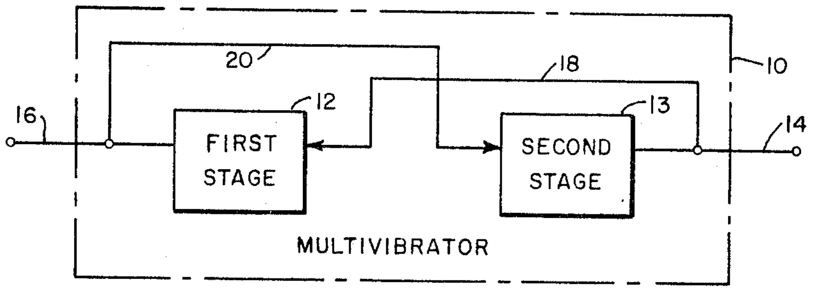
FIGURE 1 illustrates in block diagram form a typical non-redundant multivibrator.

Referring now to FIG. 1, there is shown in block diagram form a representation of a multivibration. Basically, the multivibrator 10 includes a first and second active element stage 12 and 13 which may be considered as multivibrator half sections. A signal appearing on output lead 14 is fed back and coupled to the input of the first stage 12 by means of lead 18, and in a similar fashion an output signal produced by the first stage on output lead 16 is coupled to the input of the second stage 13 by way of lead 20. In operation, two states of operation are possible, that is, one of the stages 12 or 13 is in a conductive state while the opposite stage is in a cutoff state such that an output signal appearing on output lead 14 is opposite to any output signal appearing on output lead 16. More specifically, if a binary ONE appears on output lead 14, the operation of the multivibrator is such that a binary ZERO appears on output lead 16, and if a binary ZERO appears on output lead 14 a binary ONE will appear on output lead 16. Many types of multivibrators have been developed and are well known in the art as monostable or one-shot multivibrators, bistable or FLIP-FLOPS, and astable multivibrators. A monostable multivibrator has one stable state and will switch to an unstable state for a certain period of time upon the application of an input trigger pulse and thereafter return to its stable state. The bistable or FLIP-FLOP multivibrator is characterized by the fact that two stable states are possible, and the FLIP-FLOP will remain in one of these stable states until an input trigger signal is received which causes switching to the other stable state where it will remain until another input trigger signal is received. The astable multivibrator is essentially a two stage resistance-capacitance (RC) coupled amplifier with the output of the second stage RC coupled to the input of the first stage and neither stage remains permanently conducting or cut off. This operation characterizes the astable multivibrator in that no stable state is present, but instead, the operation may be defined in terms of two quasi-stable states between which the circuit will make periodic transitions, the period depending upon various time constants of the circuit. The operation of the embodiment of the present invention will hereinafter be described with respect to an astable multivibrator configuration, however, before explaining the operation of the circuit of FIG. 4, reference should now be made to FIGS. 2 and 3.

Figure 2:
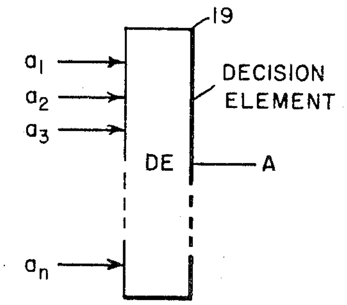
FIG. 2 illustrates a symbol which will be utilized herein to represent a decision element.

FIG. 2 is a symbol which will be utilized herein to represent a decision element, and it is seen that the decision element of FIG. 2 receives a plurality of input signals labeled $a_1$ to $a_n$ to provide an output signal A.

Figure 3:
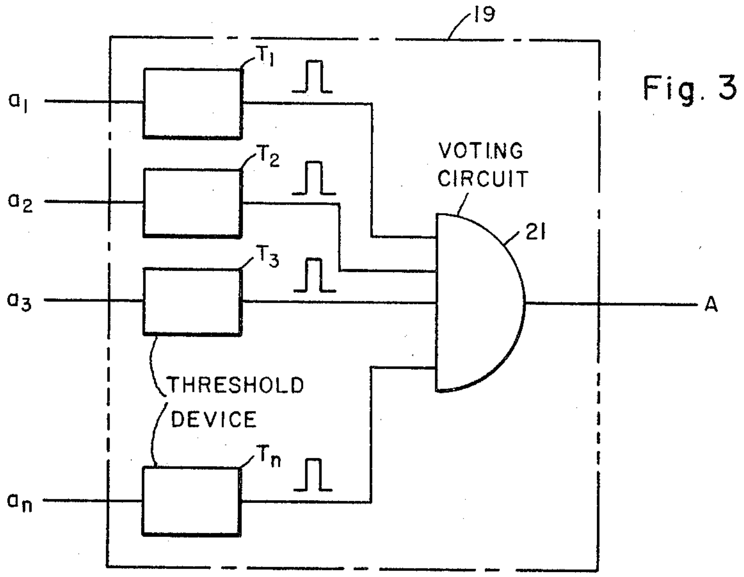
FIG. 3 illustrates a more detailed showing of the decision element of FIG. 2.

One form of decision element 19 which may be utilized herein includes a plurality of threshold devices and a binary voting circuit, and to this end, reference is now made to FIG. 3.

In FIG. 3 there is shown the decision element 19 of FIG. 2 in more detail and is seen to include a plurality of threshold devices $T_1$ to $T_n$ for receiving the input signals $a_1$ to $a_n$ respectively. The threshold devices $T_1$ to $T_n$ are of the type wherein an output pulse will be provided if a respective input signal exceeds a certain predetermined threshold voltage level. Such threshold devices are well known in the art, one being the common Schmitt trigger. A binary voting circuit 21, for example a majority voter, receives the output signals provided by the threshold devices $T_1$ to $T_n$ to thereby provide an output signal A identical to the majority of signals received from $T_1$ through $T_n$. Otherwise stated, the decision element 19 will provide an output signal A having a high or low voltage level depending on whether or not the majority of the input signals $a_1$ through $a_n$ do or do not exceed the thresholds $T_1$ through $T_n$ respectively. Other types of binary voting circuits are equally applicable in place of the majority voter 21, one such circuit being more fully described and claimed in a copending application Serial No. 315,301 filed October 10, 1963, by William C. Mann and Paul A. Jensen. The binary voting circuit therein will provide a correct output signal in accordance with a predetermined number of correct input signals and further removes the effect of an incorrect input signal by eliminating its effect on the output. The circuit is further operative to provide a correct output signal even when all but one of the input signals remain unremoved. The present invention will be described with respect to a binary voting circuit in the form of a majority voter and to this end reference should now be made to FIG. 4.

Figure 4:
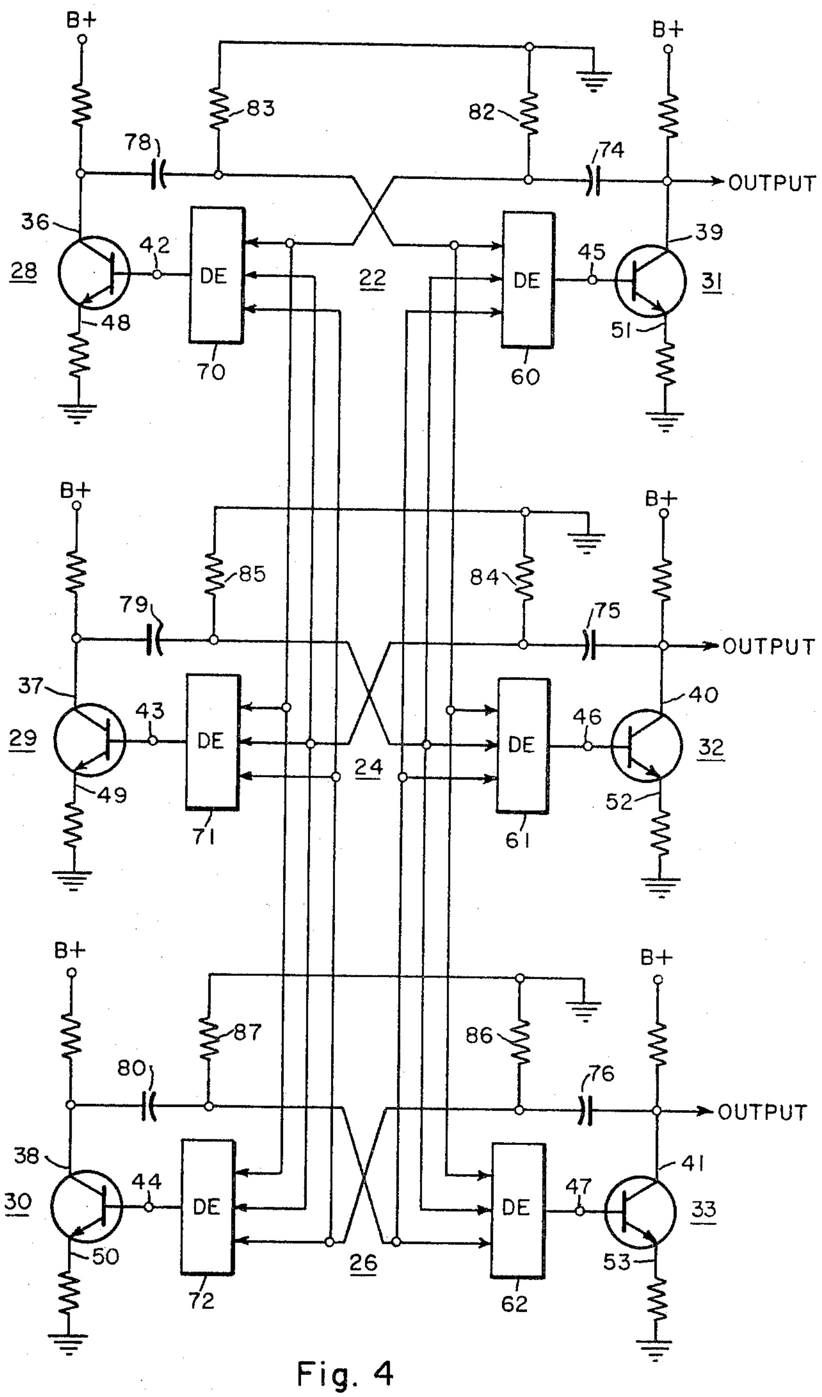
FIG. 4 is an electrical schematic diagram illustrating a preferred embodiment of the present invention.

The circuit of FIG. 4 is operable to provide a synchro-output signal in normal operation and will continue to do so even if one or more circuit components fail. To accomplish this operation there is provided a plurality of multivibrators of which three are shown, namely 22, 24 and 26. Each of the multivibrators includes a first stage multivibrator half section and a second stage multivibrator half section with each half section alternately conducting while the opposite half section is cut off. By way of example, the first stage active elements of multivibrators 22, 24 and 26 take the form of NPN transistors 28, 29 and 30 respectively, and the second stage active elements of these multivibrators take the form of NPN transistors 31, 32 and 33. Each of the transistors 28 to 33 includes an output element in the form of collector electrode 36 to 41 respectively. Also provided for each transistor is a control element shown as the base electrodes 42 to 47 respectively; an emitter electrode 47 to 53, respectively, completes the transistor circuit to ground. In order to provide a synchronous output signal, and insure synchronous operation without dependence upon any one circuit component, there is provided a first plurality of decision elements responsive to output signals provided by a predetermined number of multivibrator half sections of the first stage. Each of the decision elements 60, 61 and 62 of the first plurality is operable to provide trigger signals to a respective control, or base electrode 45, 46 and 47 of transistors 31, 32 and 33, respectively. In a similar fashion, a second plurality of decision elements is provided and is responsive to output signals provided by a predetermined number of multivibrator half sections of the second stage for providing a trigger signal to a respective control element of the first stage transistors. By way of example decision elements 70, 71 and 72 are operable to provide a trigger signal to base electrodes 42, 43 and 44 of transistors 28, 29 and 30 respectively.

Capacitor 74 is operably connected to the collector electrode 39 of transistor 31 for providing a feedback coupling signal to decision element 70, and in addition is fed to decision elements 71 and 72. Capacitor 75 of multivibrator 24 is connected to the collector electrode 40 of transistor 32 for providing a feedback coupling signal to decision element 71 in addition to decision elements 70 and 72. Capacitor 76 of multivibrator 26 is connected to the collector electrode 41 of transistor 33 for providing a feedback coupling signal to decision element 72 in addition to decision elements 70 and 71. In a similar fashion, capacitor 78 of multivibrator 22 is connected to collector electrode 36 of transistor 28 for providing a coupling signal to decision element 60 in addition to decision elements 61 and 62. Capacitor 79 is connected to collector electrode 37 of transistor 29 for providing a coupling signal to decision element 61 in addition to decision elements 60 and 62. Capacitor 80 is connected to collector electrode 38 of transistor 30 for providing a coupling signal to decision element 62 in addition to decision elements 60 and 61. It may, therefore, be seen that as a result of an output signal appearing upon a collector electrode, the capacitors in the respective multivibrators will provide a coupling signal to a predetermined number of decision elements of an opposite stage, and in the example shown the predetermined number is three, although it is to be understood that additional multivibrators may be utilized and that the decision elements may be made responsive to less than the full complement of first or second stage output signals. Resistors 82 and 83 are provided in order to complete a discharge path for capacitors 74 and 78 of multivibrator 22; resistors 84 and 85 are similarly provided to complete the discharge path for capacitors 75 and 79 of multivibrator 24; and resistors 86 and 87 are provided to complete the discharge path for capacitors 76 and 80 of multivibrator 26. It is to be understood that the respective transistors are suitably connected to proper biasing means as is well known to one skilled in the art. A synchronous output signal may be obtained by sampling the signals appearing at colletcor electrodes 39, 40 and 41 of transistors 31, 32 and 33 respectively and it is understood further that a complementary output signal will be provided at collectors 36, 37 and 38 of transistors 28, 29 and 30 respectively to thereby provide a two phase output signal although in the description of the operation of the circuit to follow, the output signals will be assumed to be provided at collector electrodes 39, 40 and 41.

In operation, consider a situation wherein the second stage transistors 31, 32 and 33 are on and conducting and the first stage transistors 28, 29 and 30 are off and non-conducting as is a common operation of a standard multivibrator. The output signals at collectors 39, 40 and 41, therefore, are low or near ground potential and may be considered as a binary ZERO, and the output signals at collectors 36, 37 and 38 are all high and are essentially at the collector supply voltage B+ and may be considered as a binary ONE signal. In a well known manner, as the charges on capacitors 74, 75 and 76 discharge, the coupling signals provided thereby increase, and the coupling signals are fed to each of the decision elements 70, 71 and 72. With these decision elements operative as threshold stimulated majority voting devices, as was stated, a trigger signal will be provided by each decision element 70, 71 and 72 to base electrodes 42, 43 and 44 to turn on transistors 28, 29 and 30 only after a majority of the coupling signals appearing at the inputs of the decision element have reached a predetermined voltage level. It may, therefore, be seen that the switching operation of each transistor of the first stage, that is, transistors 28, 29 and 30, is not dependent solely upon the coupling signal provided by its associated second stage transistor, but will switch to an on condition if two out of the three coupling signals received have reached a predetermined voltage level. When transistors 28, 29 and 30 switch to their on condition the voltage at collectors 36, 37 and 38 switch from their high voltage condition (binary ONE) to their low voltage condition (binary ZERO) which drop in voltage is coupled via capacitors 78, 79 and 80 to each of the decision elements 60, 61 and 62. If a majority of the first stage transistors 28, 29 and 30 have switched, the input signals to the decision elements will have a negative value below the predetermined threshold and no output trigger signal will be provided. Second stage transistors 31, 32 and 33 will, therefore, revert to their off and high voltage condition.

As the charges on capacitors 78, 79 and 80 discharge, the coupling signal provided thereby increases from a negative value and the coupling signals are fed to each of decision elements 60, 61 and 62. When at least a majority of these coupling signals reach a predetermined threshold value, trigger signals will be provided by decision elements 60, 61 and 62 to base electrodes 45, 46 and 47 to again turn on transistors 31, 32 and 33. It may be seen, therefore, that the switching operation of each transistor of the second stage, that is, transistors 31, 32 and 33 is not dependent solely upon the coupling signal provided by its associated first stage transistor. The aforedescribed switching action repeats and the periodicity is governed by the RC time constants of the circuit.

In operation, the output signals appearing at collectors 39, 40 and 41 of transistors 31, 32 and 33 may be fed to an additional binary voting circuit (not shown) which will provide a unitary output signal in accordance with a predetermined number of output signals received. The circuit thus far described is operable to provide a synchronous output signal even if various components exhibit characteristic changes or even if various components revert to a failed condition. By way of example, consider a situation wherein capacitor 78 due to heating, aging or the like changes value slightly such that its rate of discharge is altered. Even though the first stage decision elements 60, 61 and 62 receive this incorrect altered signal, the other two signals received from collectors 37 and 38 of transistors 29 and 30 are correct and, therefore, a trigger signal will be provided by the decision elements 60, 61 and 62 in accordance with the majority of signals received, which majority is correct. By way of further example, consider a situation wherein a transistor, for example transistor 29 fails such that the signal appearing at collector 37 is continuously low. Even though decision elements 60, 61 and 62 receive one erroneous signal, the other two signals received from collectors 36 and 38 are correct and would govern the operation of these decision elements to insure proper operation of the circuit. With transistor 29 in a failed condition the circuit will continue to provide a correct output signal even if another transistor for example 33 reverts to a failed condition such that an output signal appearing at collector 41 remains low. With these two transistors, transistors 29 and 33, in their failed condition, the first plurality of decision elements 60, 61 and 62 receive a majority of correct signals from collectors 36 and 38 of transistors 28 and 30 such that decision elements 60 and 61 will provide a trigger signal to base electrodes 45 and 46 of transistors 31 and 32. Although decision element 62 receives a majority of correct input signals a proper output signal will not be provided due to the fact that transistor 33 has failed. The second plurality of decision elements 70, 71 and 72 receive correct signals from collectors 39 and 40 to thereby provide trigger signals to base electrodes 42, 43 and 44 which will insure proper operation of the unfailed transistors 28 and 30. It may, therefore, be seen that two out of the three output signals appearing at collectors 39, 40 and 41 of transistors 31, 32 and 33 are correct and a decision device, incorporating a majority voting element, receiving these three signals will provide a correct output signal in accordance with the majority of correct input signals received. In order to provide operation as a pulse generator, the periodicity of the operation of the multivibrators may be altered simply by changing the value of the coupling capacitors 78, 79 and 80 or 74, 75 and 76 or by altering the discharge resistors 83, 85 and 87 or 82, 84 and 86 or by simultaneously changing the capacitors and their associated resistors.

Accordingly, there has been provided a redundant multivibrator comprising a plurality of first stage and second stage half sections with the first stage half sections being responsive to a predetermined number of second stage half section outputs, and the second stage half sections being responsive to a predetermined number of first stage half section outputs. A synchronous and correct output signal is provided by the circuit owing to the inclusion of a first plurality and a second plurality of decision elements which cause switching operations in accordance with a predetermined number of input signals received. A correct and synchronous output signal will still be provided even if a limited number of circuit components are altered or revert to a failed condition.

Although the present invention has been described with a certain degree of particularity, it should be understood that the present disclosure has been made by way of example and that modifications and variations of the present invention are made possible in the light of the above teachings.

What is claimed is:

1. A redundant pulse source comprising:
a plurality of multivibrators each including a first and a second stage and being of the type wherein said first and second stages alternately conduct while the opposite one of said stages is cutoff;
an ouput element for each said stage;
a control element for each said stage;
a decision element associated with each said stage responsive to output signals appearing on a predetermined number of said output elements for providing a trigger signal to an associated one of said control elements if a predetermined number of said output signals received, have a predetermined value.

2. A redundant multivibrator comprising:
a plurality of first and second transistors each including a collector, base and emitter electrode;
coupling means connected to each said collector electrode for providing a coupling signal;
a first and second plurality of decision elements;
said decision elements of said first plurality operatively connected to the coupling means of a predetermined number of said first transistors for receiving a coupling signal therefrom and being operative thereafter for providing a trigger signal if a predetermined number of said signals have a predetermined value;
said decision elements of said second plurality operatively connected to the coupling means of a predetermined number of said second transistors for receiving a coupling signal therefrom and being operative thereafter for providing a trigger signal if a predetermined number of said signals have a predetermined value.

3. A redundant multivibrator comprising:
a plurality of first stage multivibrator half sections;
a plurality of second stage multivibrator half sections;
each said stage being responsive to a trigger signal for providing a respective output signal;
and means responsive to the output signals provided by a predetermined number of multivibrator half sections of one of said stages for providing trigger signals to respective multivibrator half sections of the other of said stages.

4. A redundant multivibrator comprising:
a plurality of first and second transistors each including a collector, base and emitter electrodes;
coupling means connected to each said collector electrode for providing a feedback signal;
a first and second plurality of majority decision elements;

said decision elements of said first plurality operatively connected to the coupling means of said first transistors for receiving a feedback signal therefrom and being operative thereafter for providing a trigger signal to an associated base electrode of said second transistor if a majority of said signals have a predetermined value;

said decision elements of said second plurality operatively connected to the coupling means of a predetermined number of said second transistors for receiving a feedback signal therefrom and being operative thereafter for providing a trigger signal to an associated base electrode of said first transistors if a majority of said signals have a predetermined value.

References Cited by the Examiner

UNITED STATES PATENTS

| | | | |
|---|---|---|---|
| 2,910,584 | 10/1959 | Steele | 328—92 |
| 2,946,900 | 7/1960 | Steinman et al. | 307—88.5 |
| 3,117,237 | 1/1964 | Grady et al. | 307—88.5 |
| 3,134,032 | 5/1964 | Mann | 307—88.5 |

ARTHUR GAUSS, *Primary Examiner.*

S. D. MILLER, J. S. HEYMAN, *Assistant Examiners.*